(12) United States Patent
Vagelos

(10) Patent No.: US 11,057,732 B2
(45) Date of Patent: *Jul. 6, 2021

(54) WIRELESS HOME PHONE CONFIGURED FOR RECEIVING EMERGENCY ALERTS

(71) Applicant: TracFone Wireless, Inc., Miami, FL (US)

(72) Inventor: Theodore Vagelos, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/358,958

(22) Filed: Nov. 22, 2016

(65) Prior Publication Data

US 2017/0150334 A1  May 25, 2017

Related U.S. Application Data

(60) Provisional application No. 62/258,645, filed on Nov. 23, 2015.

(51) Int. Cl.
*H04W 4/021* (2018.01)
*H04M 7/00* (2006.01)
*H04M 3/02* (2006.01)
*H04W 4/90* (2018.01)

(52) U.S. Cl.
CPC .......... *H04W 4/021* (2013.01); *H04M 3/02* (2013.01); *H04M 7/0069* (2013.01); *H04W 4/90* (2018.02); *H04M 2201/38* (2013.01); *H04M 2242/04* (2013.01)

(58) Field of Classification Search
CPC ......... H04W 4/90; H04W 4/22; H04W 4/021; H04M 2242/04; H04M 7/0069; H04M 3/02; H04M 2201/38
USPC .......... 455/404.1, 426.1, 426.2, 552.1, 456.1
See application file for complete search history.

(56) References Cited

U.S. PATENT DOCUMENTS

| 5,991,641 | A  | * | 11/1999 | Goni | H04M 1/725 455/557 |
| 6,466,799 | B1 | * | 10/2002 | Torrey | H04M 1/725 455/462 |
| 7,010,325 | B1 | * | 3/2006 | Oh | H04B 7/2606 455/556.1 |
| 7,860,224 | B1 | * | 12/2010 | Barzegar | H04M 3/537 379/88.17 |
| 8,224,307 | B2 | * | 7/2012 | Ray | H04W 36/30 370/352 |
| 9,549,303 | B2 | * | 1/2017 | Zhang | H04W 4/90 |
| 2009/0042546 | A1 | * | 2/2009 | McClendon | G08B 27/006 455/414.1 |
| 2009/0111518 | A1 | * | 4/2009 | Agrawal | H04M 1/72502 455/557 |
| 2010/0054427 | A1 |  | 3/2010 | Luneau |  |
| 2010/0226481 | A1 | * | 9/2010 | Tischer | H04L 12/66 379/37 |
| 2011/0117874 | A1 | * | 5/2011 | Shaw | G08B 27/006 455/404.1 |

(Continued)

*Primary Examiner* — Farid Seyedvosoghi
(74) *Attorney, Agent, or Firm* — BakerHostetler

(57) ABSTRACT

A wireless telephone base station for a telephone includes a transceiver configured to receive emergency alerts, a display configured to show the emergency alerts, an output device configured to play the emergency alerts, and a processor configured to show the emergency alerts on the display and to play the emergency alerts on the output device.

19 Claims, 5 Drawing Sheets

(56) References Cited

U.S. PATENT DOCUMENTS

| | | | |
|---|---|---|---|
| 2011/0125898 A1* | 5/2011 | Hassan | H04L 12/2834 |
| | | | 709/225 |
| 2011/0212700 A1* | 9/2011 | Petite | G01S 19/17 |
| | | | 455/404.1 |
| 2012/0136923 A1* | 5/2012 | Grube | H04W 4/90 |
| | | | 709/203 |
| 2012/0149308 A1 | 6/2012 | Rothkopf | |
| 2015/0188611 A1* | 7/2015 | Tsuzuki | H04B 5/02 |
| | | | 455/41.1 |
| 2018/0270630 A1* | 9/2018 | Levine | H04M 15/49 |

* cited by examiner

WIRELESS HOME PHONE CONFIGURED FOR RECEIVING EMERGENCY ALERTS

CROSS REFERENCE TO PRIOR APPLICATIONS

This application claims the benefit from U.S. Provisional Application No. 62/258,645 filed on Nov. 23, 2015, which is hereby incorporated by reference for all purposes as if fully set forth herein.

BACKGROUND OF THE DISCLOSURE

1. Field of the Disclosure

The disclosure relates to a wireless home phone system. More particularly, the disclosure relates to devices, systems, and methods for providing emergency alerts to a wireless home phone system.

2. Related Art

A large number of wireless service plans exist for customers desiring wireless services. Wireless devices in the United States are now capable of receiving emergency alerts from the U.S. Government and/or other authorities. Wireless devices associated with these wireless service plans benefit from being able to receive and display the emergency alerts from the government and/or other authorities.

A wireless home phone service is a service that allows a regular wired telephone to connect to a cellular network, as if it were a mobile phone. A device contains the necessary electronics which allow plain old telephone service to be provided to one or two telephone jacks on the back of the unit, as well as having a small radio antenna and a transceiver for the wireless side of the connection. However, wireless home phones do not have the ability to receive emergency alerts. This results in a limited user experience.

The following needs can be addressed by a system, method, and device for providing and displaying emergency alerts on wireless home phone systems.

SUMMARY OF THE DISCLOSURE

The foregoing needs are met, to a great extent, by the disclosure, providing a device, system, and method for providing and displaying emergency alerts on a wireless home phone system.

According to some aspects of the disclosure, a wireless telephone base station for a telephone includes a transceiver configured to connect to a wireless network, a connection configured to connect to a telephone in order for a user to place and receive telephone calls, the transceiver configured to receive emergency alerts from the wireless network, a display configured to display the emergency alerts received from the wireless network, and a processor configured to provide the emergency alerts to the display.

According to some aspects of the disclosure, a system for providing emergency alerts with a wireless telephone base station for a telephone includes a wireless telephone base station having a transceiver configured to connect to a wireless network, the wireless telephone base station including a connection configured to connect to a telephone in order for a user to place and receive telephone calls, the wireless telephone base station further configured to receive emergency alerts, and the wireless telephone base station further comprising a display configured to display the emergency alerts and a processor configured to provide the emergency alerts to the display.

According to some aspects of the disclosure, a method of providing emergency alerts with a wireless telephone base station for a telephone includes placing and receiving, with a transceiver of the wireless telephone base station, telephone calls over a wireless network, receiving, with the transceiver of the wireless telephone base station, the emergency alerts, displaying on a display of the wireless telephone base station the emergency alerts, and playing, with a speaker of the wireless telephone base station, an audio announcement of the emergency alerts.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will also form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

Figure 1:
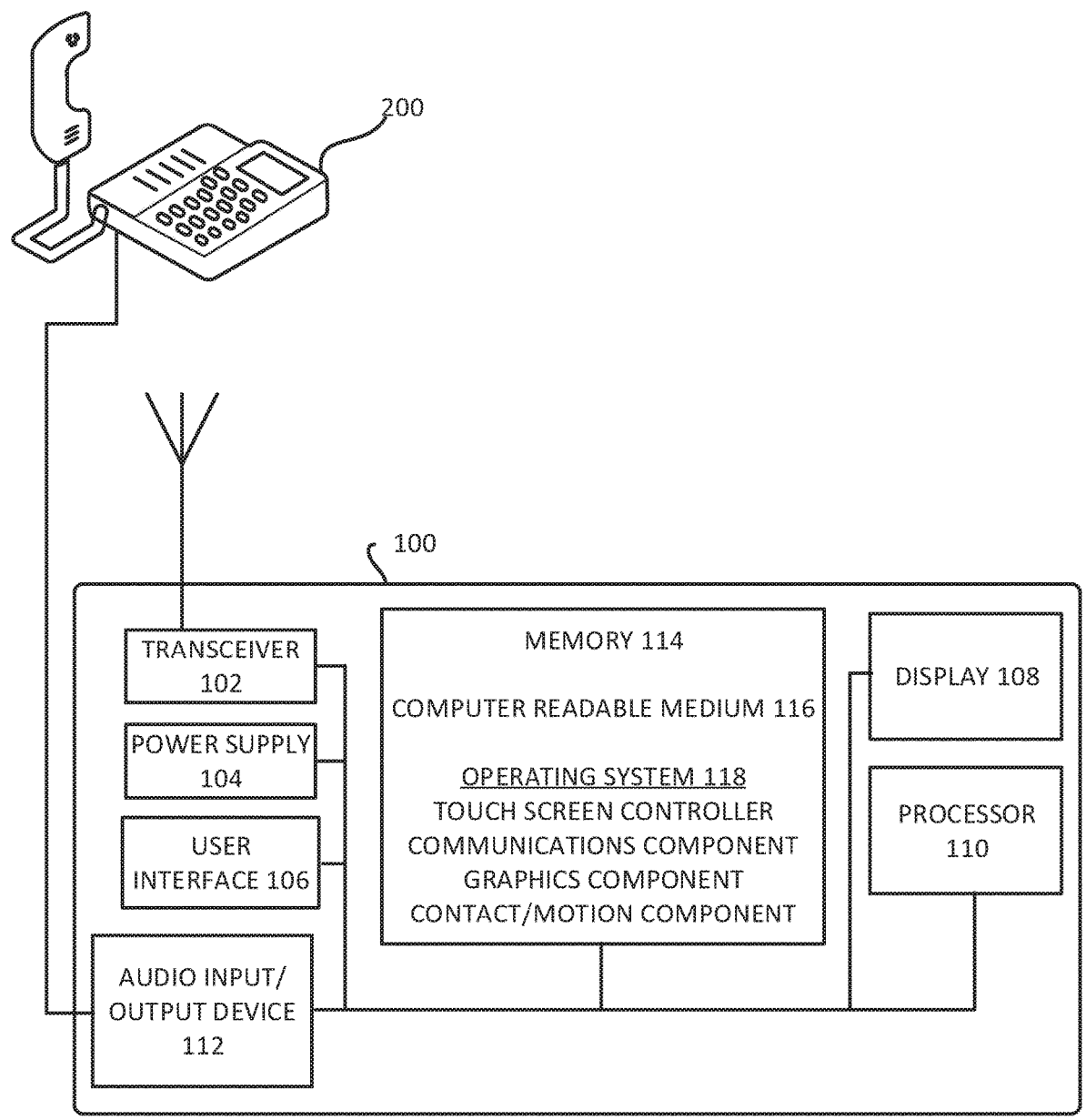
FIG. 1 illustrates an exemplary wireless home phone base station and its components, in accordance with aspects of the present disclosure.

Wireless home telephones may connect to a "wireless network" or "network" and are intended to encompass any type of wireless network to obtain or provide phone services through the use of a wireless device, such as, for example, 3G, 4G, 5G (5th generation mobile networks/wireless systems), Long Term Evolution (LTE), Evolution-Data Optimized (EVDO), Code Division Multiple Access (CDMA), High Speed Packet Access (HSPA), Global System for Mobile Communications (GSM W-CDMA (Wideband Code-Division Multiple Access), Wi-Fi, Bluetooth, a communication channel as defined herein, and/or the like, and/or combinations thereof that may utilize the teachings of the present application to implement the use of one or more wireless home telephones. The wireless home telephone may further connect to a standard house phone as is further described below to provide telephone service to a household.

Generally, companies that provide post-paid wireless services are wireless carriers or Mobile Network Operators (MNO) that maintain and control their own wireless networks. An MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including wireless home telephones, which allow subscribers to connect a telephone to a carrier through a wireless telephone base station. The teachings of the disclosure herein are applicable to both MN© and MVNO implementations of a wireless home telephone.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

Emergency alerts for telephones may include Presidential alerts, extreme alerts, severe alerts, amber alerts, and the like. The emergency alerts may be popups, text messages, audio messages, video messages, hyperlinks, or the like. The emergency alerts may use a point-to-multipoint system so that they are only delivered to wireless telephone base stations and wireless devices within a limited geographic location or area. Emergency alerts can also include warnings of weather risks, natural disasters, national security threats, important national news, and the like.

FIG. 1 illustrates an exemplary wireless base station 100 according to the disclosure and its potential components. The wireless telephone base station 100 may include a transceiver 102, a power supply 104, a user interface 106, a display 108, a processor 110, an audio input/output device 112, a memory 114, a computer readable medium 116, an operating system 118, and the like. The transceiver 102 can include, for example, a wireless antenna and associated circuitry capable of data transmission with the mobile data network utilizing at least one data transmission protocol, such as, for example, 3G, 4G, 5G (5th generation mobile networks/wireless systems), Long Term Evolution (LTE), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The transceiver 102 may transmit and receive data over the data transmission protocol in order to provide telephone service to a connected telephone.

The power supply 104 may be a battery such as nickel cadmium, nickel metal hydride, lead acid, lithium ion, lithium ion polymer, and the like. The power supply 104 may be charged by and/or receive power from a power receptacle or another external power source such as a nominal 120 V household power supply. The power supply 104 may be implemented without a battery and utilize an external power source such as a nominal 120 V household power supply only to provide power.

In another aspect of the present disclosure, the user interface 106 may accept user inputs and provide outputs via the display 108. The user inputs may include responses to the emergency alerts, such as acknowledgements that the emergency alerts have been read or heard, saving the emergency alert, deleting the emergency alert, dialing an emergency number or other predetermined telephone number, transmitting an emergency alert to an external source, or the like.

The display 108 of the wireless telephone base station 100 can show various information provided from the power supply 104, the processor 110, the memory 114, the computer readable medium 116, or the like. The display 108 may have a screen which may be a light-emitting diode display (LED), an electroluminescent display (ELD), a plasma display panel (PDP), a liquid crystal display (LCD), an organic light-emitting diode display (OLED), or any other display technology.

The displayed information can include, for example, the emergency alerts, the amount of prepaid wireless data service available, the network connection strength, the type of mobile network data connection (such as 3G, 4G, 5G, LTE, EVDO, etc.) to which the wireless telephone base station 100 is connected, battery life, the power supply 104 strength, and/or other information potentially useful to the user. If the display 108 is a touch-screen, the user may interact with icons on the display 108 to select the various types of information available for display. For example, the display 108 may simultaneously show the information. Alternatively, the display 108 may only show one type of information at a time. The display 108 may then show other types of information if the user interacts with buttons on the wireless telephone base station 100 or, if the display 108 is a touch-screen, with icons on the display 108. To indicate a wireless emergency alert, for example, the display 108 may further include a light, such as an LED or another type of light serving as a visual alert, which can vary in color to distinguish between different types of alerts. The light may flash in different patterns to indicate various types of emergency alerts and/or whether the emergency alerts have been read or heard.

The processor 110 can be, for example, dedicated hardware as defined herein, a computing device as defined herein, a programmable logic array (PLA), a programmable array logic (PAL), a generic array logic (GAL), a complex programmable logic device (CPLD), an application-specific integrated circuit (ASIC), a field-programmable gate array (FPGA), a processor, a microprocessor or any other programmable logic device (PLD) configurable to provide the wireless home phone functionality and the emergency alerts display functionality. Additionally, the processor 110 may communicate to or show on the display 108 the various metrics described above.

Additionally, the wireless telephone base station 100 may include the audio input/output device 112 for the input or output of sounds in the emergency alerts, user responses to the emergency alerts, and the like. For example, the audio input/output device 112 may read aloud or play a sound to indicate the wireless emergency alert, its source, type, and the like via a speaker output device. The audio input/output device 112 may further include a connection to connect to the telephone 200 via an RJ-45 cable or the like to provide telephone service to the telephone 200, and to provide audio or visual outputs, including the wireless emergency alerts, to the telephone 200.

For example, the wireless telephone base station 100 may connect the telephone 200 to a service provider. The wireless telephone base station 100 may further generate a dial tone, provide access to voice mail, and generate audio for a telephone call that may be received by the wireless telephone base station 100 and may accordingly be passed from the wireless telephone base station 100 to the telephone 200.

The wireless telephone base station 100 may also include a memory 114, which could be an internal memory or a removable storage type such as a memory chip. The memory 114 may store information about the wireless telephone base station 100, including wireless profiles and settings. The memory 114 may further include a SIM or UICC card type memory to enable communication with a wireless network requiring the same.

For the purposes of this disclosure, the computer readable medium 116 may store computer data, which may include computer program code that may be executable by the processor 110 in machine readable form. By way of example, and not limitation, the computer readable medium 116 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data.

In one or more aspects of the present disclosure, the actions and/or events of a method, algorithm, or module may reside as one or any combination or set of codes and/or instructions on a computer readable medium 116 or machine readable medium, which may be incorporated into a computer program product. The computer readable medium 120 may also store the values for the emergency alerts, the amount of memory used and available on the account associated with the wireless telephone base station 100, the amount of wireless data service available, the amount of wireless data service used, the signal strength, the strength of the power supply 104, how many days of wireless service remaining, and the like. Additionally, the computer readable medium 116 may communicate to the display 108 to show the various metrics described above.

The user interface 106 may facilitate use of the wireless telephone base station 100 with an operating system 118. The operating system 118 may be associated with a touchscreen controller, one or more communications components, one or more graphics components, one or more contact/motion components, and the like.

Figure 2:
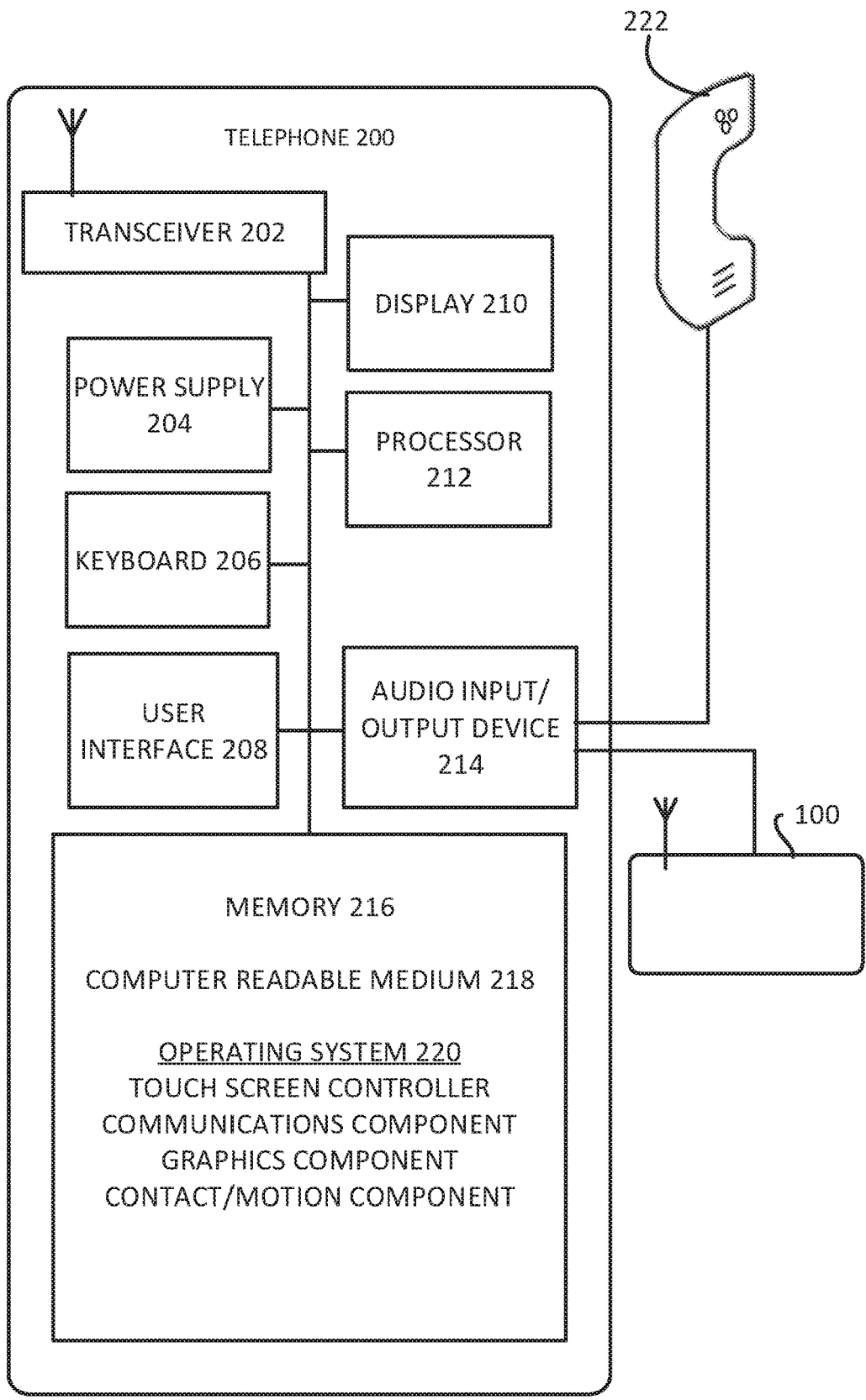
FIG. 2 illustrates an exemplary telephone of FIG. 1, in accordance with aspects of the present disclosure.

The wireless telephone base station 100 may also be used in conjunction with a telephone 200 as further illustrated in FIG. 2. The wireless telephone base station 100 may physically or wirelessly connect to the telephone 200. The telephone 200 may be part of a home phone system when coupled with the wireless telephone base station 100. The telephone 200 may have a transceiver 202, a power supply 204, a keyboard 206, a user interface 208, a display 210, a processor 212, an audio input/output device 214, a memory 216, a computer readable medium 218, an operating system 220, a handset 222, and the like. The computer readable medium 218 may include an application for implementing the process according to FIG. 4.

Alternatively, the telephone 200 may be a more simplistic implementation that may include a speaker, a microphone, a hook switch, a touchtone keypad and frequency generator, a duplex coil, and a ringer speaker all connected by a common wire pair.

Text or audio received by the telephone 200 from the wireless telephone base station 100 may be shown on the display 210 and output via the audio input/output device 214 or the handset 222. Settings for the display/output of the emergency alerts and/or other audio and visual outputs may be adjusted on the telephone 200 and/or may be adjusted on the wireless telephone base station 100.

In an alternative aspect of the disclosure, the transceiver 202 may also be a separate device from the telephone 200, in which case the transceiver 202 may communicate with the telephone 200 and the wireless telephone base station 100. In this alternative aspect, the telephone 200 may not be required to directly connect to the wireless telephone base station 100.

The display 210 of the telephone 200 can show various information provided to the display 210 from the processor 212, computer readable medium 218, or the like. The display 210 may have a screen which may be a light-emitting diode display (LED), an electroluminescent display (ELD), a plasma display panel (PDP), a liquid crystal display (LCD), an organic light-emitting diode display (OLE©), or any other display technology.

The processor 212 can be, for example, dedicated hardware as defined herein, a computing device as defined herein, a programmable logic array (PLA), a programmable array logic (PAL), a generic array logic (GAL), a complex programmable logic device (CPLD), an application-specific integrated circuit (ASIC), a field-programmable gate array (FPGA), a processor, a microprocessor, or any other programmable logic device (PLD) configurable to execute a metering client.

The processor 212 may be able to translate emergency alerts into audible or visible messages on the telephone 200. In one example, the telephone 200 may have a cordless handset 222. In order to provide to a user the emergency alerts received by the wireless telephone base station 100, the telephone 200 may receive the emergency alert from the wireless telephone base station 100 and then output the emergency alert via the handset 222. In the case of an audible message, the processor 212 may facilitate the playing of a sound or recording announcing the alert. The sound or recording may be output via the audio input/output device 214 on the telephone 200 of via the handset 222, even during a telephone call. In the case of a visible message, the processor 212 may output a text string to the display 210 and/or may transmit the message to the handset 222. The processor 212 may facilitate the showing of the emergency alerts on the display 210, and may facilitate automatic dialing of 911 or other predetermined emergency numbers in cases of recognized emergencies, power outages, or other predetermined circumstances.

Figure 3:
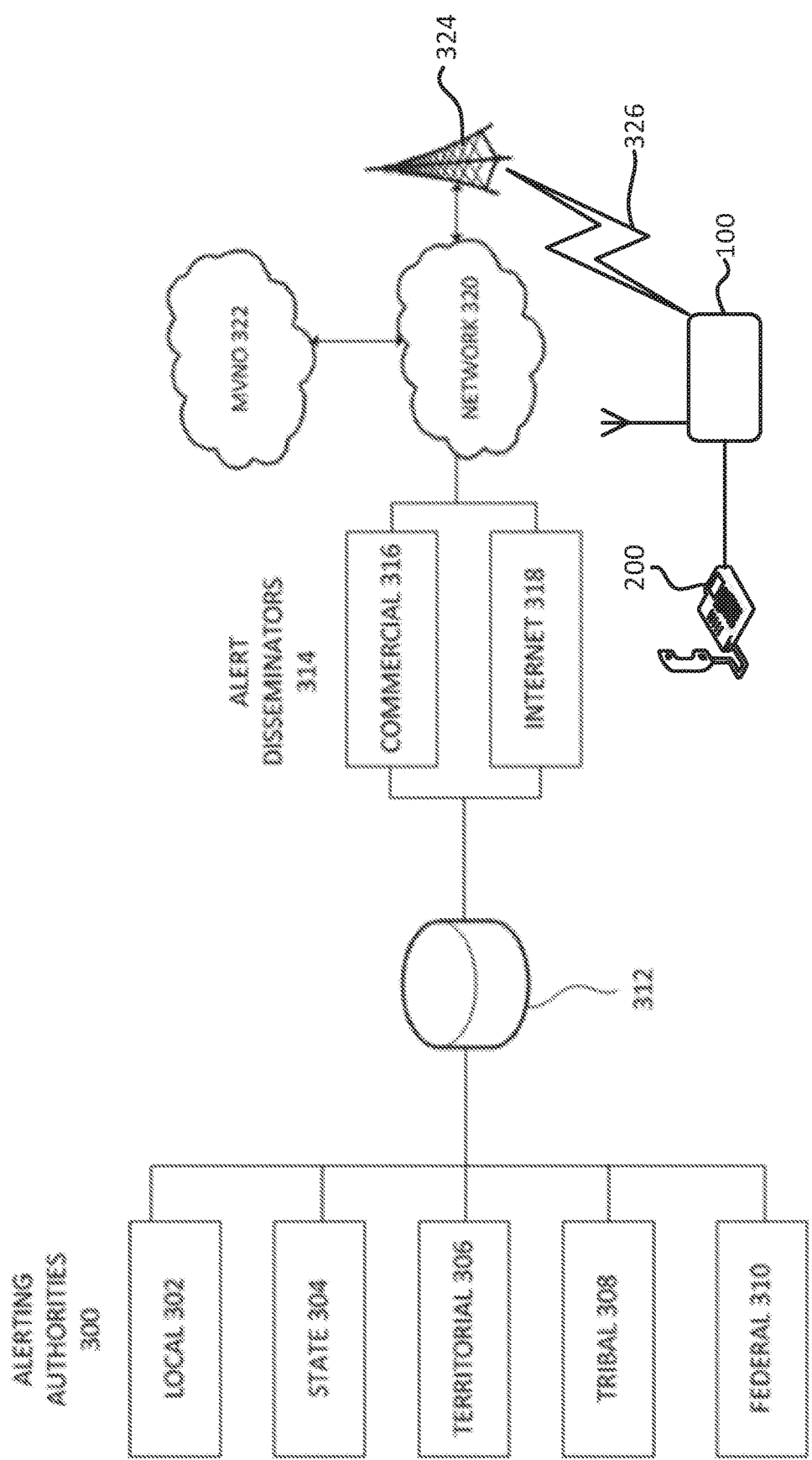
FIG. 3 illustrates a system for providing emergency alerts to the wireless home phone base station of FIG. 1, in accordance with aspects of the present disclosure.

FIG. 3 illustrates an example of how the wireless telephone base station 100 and the telephone 200 may receive the emergency alerts. Alerting authorities 300 may include local 302, state 304, territorial 306, tribal 308, federal 310, and the like. Each alerting authority 300 may correspond to a level of government or an organization responsible for communicating the emergency alert. Alerting authorities 300 may transmit the emergency alert to a router 312 which may collect all emergency alerts and route them to various alert disseminators 314. The alert disseminators 314 may include commercial 316, Internet 318, and other disseminators. The alert disseminators 314 may transmit alerts to a network 320, which may communicate with a MVNO network 322. The network 320 or the MVNO network 322 may also transmit the alerts to a service node 324 for the network 320. The network 320 may be a MNG network. A wireless communication channel 326 may connect the service node 324 to the wireless telephone base station 100 to provide wireless service and the emergency alerts to the wireless telephone base station 100. The alerting authorities 300, the alert disseminators 314, the MVNO network 322, and/or the network 320 may operate in conjunction with a server.

A commercial alert 316 may be provided to the telephone 200 when the wireless telephone base station 100 is connected to the MVNO network 322. An alert from the internet 318 may be received if the wireless telephone base station 100 is connected to the internet. The alert disseminators 314 may transmit, via the service node 324 and the communication channel 326, the emergency alerts to devices such as the wireless telephone base station 100. The emergency alerts provided by the alerting authorities 300 may be visual and/or audio, and may include text messages, voice messages, color-coded alerts, and the like.

Figure 4:
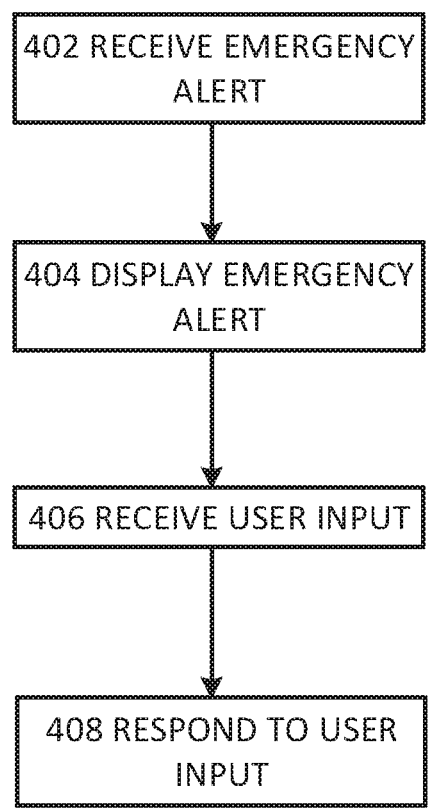
FIG. 4 illustrates an algorithm for providing emergency alerts to the wireless home phone base station of FIG. 1, in accordance with aspects of the present disclosure.

FIG. 4 illustrates an example of a process by which the wireless telephone base station 100 receives and may respond to the emergency alerts. At box 402, the wireless telephone base station 100 receives an emergency alert, Next, at box 404, the wireless telephone base station 100 displays the emergency alert and/or plays an audio message containing the emergency alert. In response to the emergency alert, the user may offer a user input to the wireless telephone base station 100, which may receive that user input at box 406. In response to receiving the user input, the wireless telephone base station 100 may respond to that user input. For example, if the user input is an acknowledgment that the user has read or heard the emergency alert, the wireless telephone base station 100 may accordingly take notice of that by no longer displaying the emergency alert, storing the emergency alert in a database of already-read emergency alerts, or deleting the emergency alert 408.

Figure 5:
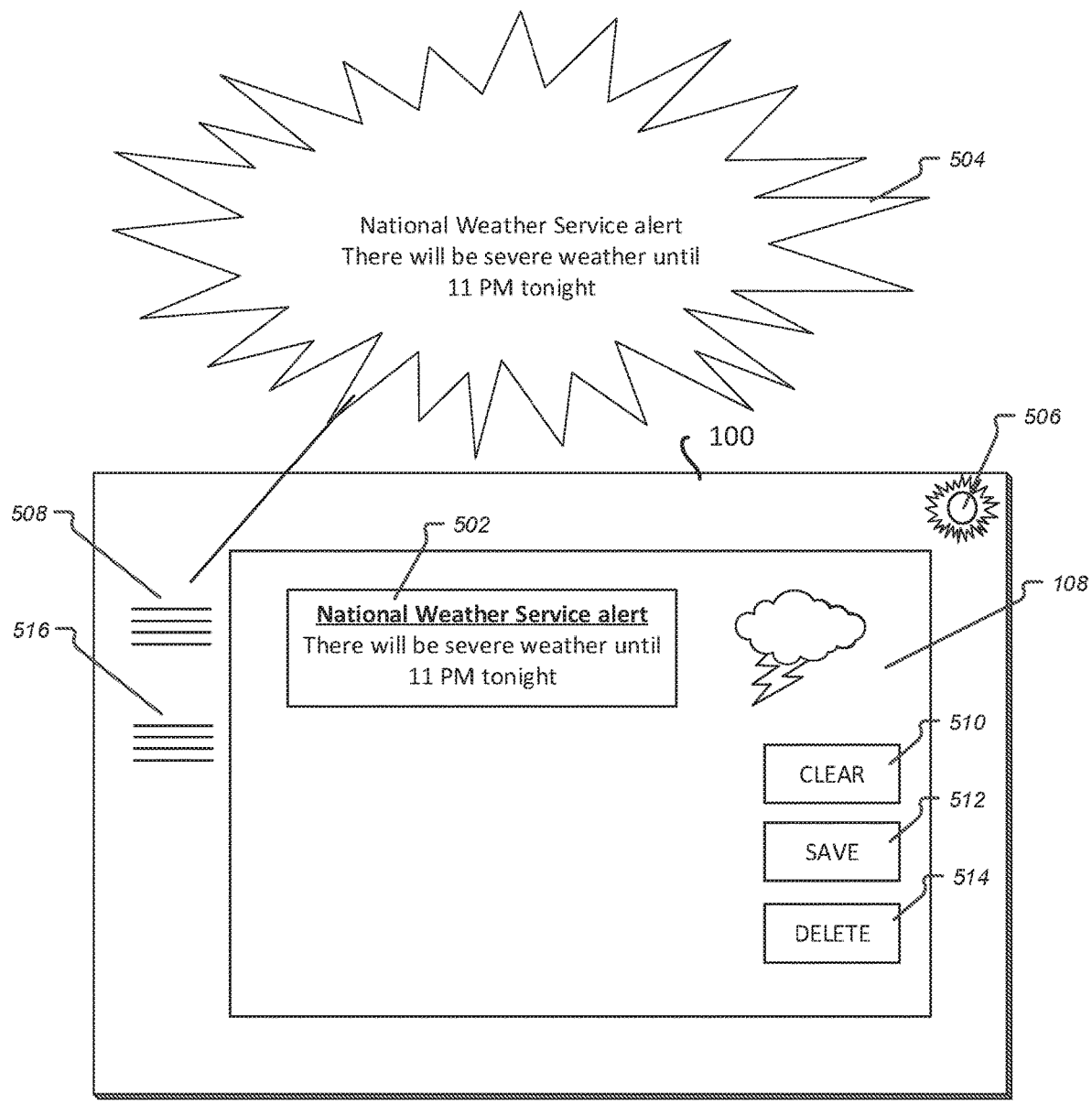
FIG. 5 illustrates an exemplary wireless home phone base station operating in accordance with aspects of the present disclosure.

FIG. 5 illustrates an exemplary wireless home phone base station operating in accordance with aspects of the present disclosure. In particular, the wireless telephone base station 100 includes the display 108. The display 108 may be a liquid crystal display. On the display 108 is an alert 502. Additionally, the wireless telephone base station 100 may include a light 506 that may implemented as a light emitting diode or the like, which provides an indication of the alert 502. Moreover, the wireless telephone base station 100 may include a speaker 508 operating in conjunction with the audio input/output device 112. The speaker 508 providing an audio output 504 verbalizing the alert. Additionally, the display 108 may include icons 510, 512, 514. The icon 510 may clear the alert 502 from the display 108. The icon 512 may save the alert 502 within the memory 114 of the wireless telephone base station 100. The icon 514 may delete the alert 502 from the memory 114 of the wireless telephone base station 100. The wireless telephone base station 100 may further include other features consistent with the disclosure herein.

In a further aspect, the wireless telephone base station 100 may include a microphone 516 operating in conjunction with the audio input/output device 112. The microphone 516 providing an audio input for responding to the alert utilizing voice recognition software. The audio input may be commands from the user to clear the alert 502 from the display 108, to save the alert 502 within the memory 114 of the wireless telephone base station 100, and/or delete the alert 502 from the memory 114 of the wireless telephone base station 100.

Accordingly, the disclosure allows for the implementation of a system, method, and device for providing and displaying emergency alerts on wireless home phone systems. Such alerts provide an increased level of information and emergency awareness that was previously not available to users of wireless home phone systems.

Further in accordance with various aspects of the disclosure, the alerts may be Wireless Emergency Alerts. The Wireless Emergency Alerts is an alerting network in the United States designed to disseminate emergency alerts to mobile devices such as cell phones and pagers. The Federal Communications Commission proposed and adopted the network structure, operational procedures and technical requirements in 2007 and 2008 in response to the Warning, Alert, and Response Network (WARN) Act passed by Congress in 2006. CMAS will allow federal agencies to accept and aggregate alerts from the President of the United States, the National Weather Service (NWS) and emergency operations centers, and send the alerts to participating wireless providers who will distribute the alerts to their customers with compatible devices via Cell Broadcast, a technology similar to SMS text messages that simultaneously delivers messages to all phones using a cell tower instead of individual recipients. The government plans to issue three types of alerts through this system: Alerts issued by the President of the United States; Alerts involving imminent threats to safety of life, issued in two different categories: extreme threats and severe threats; AMBER Alerts.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem. The dictation event subsystem may analyze the candidate sets and choose the best match candidate with the highest degree of similarity. This candidate is then considered the correct translation, and the dictation event subsystem forwards the translation to the text event subsystem which in turn inputs the translated text into the device.

The network node 324, the network 320, and/or the MVNO 322 may include or connect with a network that includes a Mobile services Switching Center (MSC) that may perform the switching of calls and that may include a Visitor Location Register (VLR). The network may also include a Base Transceiver Station (BTS) and a Base Station Controller (BSC). The base transceiver station houses the radio transceivers that define a cell and handle the radio-link protocols with the wireless telephone base station 100. The base station controller manages the radio resources for one or more base transceiver stations. The base station controller is the connection between the wireless telephone base station 100 and the Mobile service Switching Center (MSC).

A Home Location Register (HLR) and the VLR together with the MSC, provide the call-routing and roaming capabilities. The HLR contains all the administrative information of each subscriber registered in the corresponding network, along with the current location of the wireless telephone base station 100. The above is an exemplary implementation of the network. Other types of networks utilizing other types of protocols may be implemented as well and are contemplated by the disclosure.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The disclosure may include the communication channels 326 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), 5G, EVolution-Data Optimized (EVDO) and/or the like, and/or a combination of two or more thereof.

The disclosure may be implemented in any type of computing devices, such as, e.g., the wireless telephone base station 100, a desktop computer, personal computer, a laptop/mobile computer, a personal data assistant (PDA), a mobile phone, a tablet computer, cloud computing device, and the like, with wired/wireless communications capabilities via the communication channels 326.

In an aspect, the disclosure may be implemented in any type of wireless telephone base station 100 and corresponding telephone or wireless phone that is operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

The application described in the disclosure may be implemented to execute on an Apple™ OS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless home phone system comprising:
a wireless telephone base station; and
a home telephone, the wireless telephone base station configured to connect the home telephone to a wireless network,
the wireless telephone base station comprising:
a transceiver and a wireless antenna configured to connect to the wireless network implemented by a Mobile Network Operator (MNO) utilizing at least one of the following protocols: 3G, 4G, 5G, LTE, and GSM;
the transceiver further configured to connect to the wireless network and provide wireless telephone service to the home telephone;
an audio input/output device having a cable connection configured to connect via a cable to the home telephone in order for a user to place and receive telephone calls;
the transceiver further configured to provide the wireless telephone service to the user to place and receive the telephone calls via the home telephone;
the transceiver further configured to receive emergency alerts from the wireless network via cell broadcast;
a display included with the wireless telephone base station and the display configured to display the emergency alerts received from the wireless network via cell broadcast; and
a processor included with the wireless telephone base station and the processor configured to translate the emergency alerts and output text to the display in order to display the emergency alerts received from the wireless network via cell broadcast,
wherein the wireless telephone base station further comprises a speaker operating in conjunction with the audio input/output device, the speaker providing an audio output associated with the emergency alerts that comprises verbalizing and/or reading aloud the emergency alerts;
wherein the processor is further configured to translate the emergency alerts into audible messages and the processor is configured to facilitate the verbalizing and/or the reading aloud the emergency alerts by the speaker of the audio input/output device;
wherein the cable connection comprises a telephone jack arranged on the wireless telephone base station;
wherein the home telephone does not have an ability to receive emergency alerts; and
wherein the wireless telephone base station is configured to receive the emergency alerts and display the emergency alerts on the display of the wireless telephone base station.

2. The wireless home phone system of claim 1, wherein the wireless telephone base station further comprises:
a lighted visual indicator configured to indicate that the emergency alerts have been received from the wireless network via cell broadcast,
wherein the display is further configured to display a plurality of icons,
wherein the plurality of icons comprise at least one of the following: a clear alert icon that clears an alert from the display, a save alert icon that saves an alert within a memory, and a delete alert icon that leads an alert from a memory,
wherein the display is further configured to display a network connection strength, and
wherein the home telephone comprises a hook switch.

3. The wireless home phone system of claim 1, wherein the wireless telephone base station further comprises:
a memory, the memory storing wireless profiles, wireless settings, and an operating system,
wherein the emergency alerts are wireless emergency alerts provided to a limited geographic area received from the wireless network via cell broadcast, and
wherein the display is further configured as a touchscreen.

4. The wireless home phone system of claim 1, wherein the wireless telephone base station further comprises:
a microphone operating in conjunction with the audio input/output device, the microphone configured to receive audio input that comprises vocal commands from a user,
the processor being configured to implement voice recognition software to generate audio input commands, and
the audio input commands received by the microphone and recognized by the processor implementing at least one of the following:
clear the emergency alerts received from the wireless network via cell broadcast from the display,
save the emergency alerts received from the wireless network via cell broadcast from the display, and
delete the emergency alerts received from the wireless network via cell broadcast from the display,
wherein the home telephone comprises a standard house phone,
wherein the wireless telephone base station is further configured to provide access to voicemail for the home telephone, and
wherein the wireless telephone base station is further configured to generate audio signals for a telephone call for the home telephone.

5. The wireless home phone system of claim 1,
wherein the cable connection comprises a RJ-45 cable connection to connect the home telephone to the wireless telephone base station,
wherein the wireless telephone base station is further configured to generate a dial tone for the home telephone,
wherein the display is further configured to display an amount of wireless service available,
wherein the wireless telephone base station is further configured to generate audio signals for a telephone call for the home telephone, and
wherein the home telephone comprises a wired home phone.

6. A wireless home phone system for providing wireless emergency alerts with a wireless telephone base station for a home telephone, the wireless home phone system comprising:
a wireless telephone base station; and
a home telephone, the wireless telephone base station configured to connect the home telephone to a wireless network,
the wireless telephone base station comprising:
a transceiver and a wireless antenna configured to connect to a wireless network implemented by a Mobile Network Operator (MNO) utilizing at least one of the following protocols: 3G, 4G, 5G, LTE, and GSM;
the transceiver further configured to connect to the wireless network and provide wireless telephone service;
an audio input/output device having a cable connection configured to connect via a cable to the home telephone in order for a user to place and receive telephone calls;

the transceiver further configured to provide wireless telephone service in order for the user to place and receive the telephone calls via the home telephone;

the wireless telephone base station further configured to receive wireless emergency alerts transmitted via cell broadcast from the wireless network; and the wireless telephone base station further comprising a display and a processor, the processor configured to translate the wireless emergency alerts and output text to the display and the display configured to display the wireless emergency alerts translated by the processor to provide the wireless emergency alerts to the display, wherein the wireless telephone base station further comprises a speaker operating in conjunction with the audio input/output device, the speaker providing an audio output associated with the emergency alerts that comprises verbalizing and/or reading aloud the emergency alerts;

wherein the processor is further configured to translate the emergency alerts into audible messages and the processor is configured to facilitate the verbalizing and/or the reading aloud the emergency alerts by the speaker of the audio input/output device;

wherein the cable connection comprises a telephone jack arranged on the wireless telephone base station;

wherein the home telephone does not have an ability to receive emergency alerts; and wherein the wireless telephone base station is configured to receive the emergency alerts and display the emergency alerts on the display of the wireless telephone base station.

7. The wireless home phone system of claim 6, wherein the wireless telephone base station further comprises:

a microphone configured to receive audio input that comprises vocal commands from a user, the processor being configured to implement voice recognition software to generate audio input commands based on the vocal commands from the user that comprise at least one of the following:

clear the wireless emergency alerts received from the wireless network via cell broadcast from the display, save the wireless emergency alerts received from the wireless network via cell broadcast from the display, and delete the wireless emergency alerts received from the wireless network via cell broadcast from the display, wherein the wireless telephone base station is further configured to generate a dial tone for the home telephone, wherein the home telephone comprises a standard house phone, and wherein the wireless telephone base station is further configured to provide access to voicemail for the home telephone.

8. The wireless home phone system of claim 7, wherein the home telephone comprises a hook switch;

wherein the display is further configured to display an alert signal generated by the wireless telephone base station in response to receiving the Wireless Emergency Alerts that are received via cell broadcast from the wireless network; and wherein the display is further configured to display a network connection strength.

9. The wireless home phone system of claim 8, wherein: the alert signal is a light that is controlled by the wireless telephone base station; and the display is further configured as a touchscreen.

10. The wireless home phone system of claim 7, wherein the wireless emergency alerts are wireless emergency alerts provided to a limited geographic area;

wherein the Wireless Emergency Alerts comprise Wireless Emergency Alerts transmitted via cell broadcast from the wireless network; and wherein the display is further configured to display an amount of wireless service available.

11. The wireless home phone system of claim 10, wherein the wireless telephone base station further comprises:

a memory, the memory storing wireless profiles, wireless settings, and an operating system, wherein the display is configured to indicate that the wireless emergency alert transmitted via cell broadcast from the wireless network is provided by one of a plurality of alerting authorities.

12. The wireless home phone system of claim 11, wherein the display is further configured to indicate which of the plurality of alerting authorities has provided the wireless emergency alert and to communicate a content of the wireless emergency alert; and wherein the cable connection comprises a telephone jack arranged on the wireless telephone base station.

13. A method of providing wireless emergency alerts with a wireless telephone base station for a home telephone, the method comprising:

connecting to a wireless network with a transceiver and a wireless antenna of a wireless telephone base station to provide wireless telephone service, the wireless network implemented by a Mobile Network Operator (MNO) utilizing at least one of the following protocols: 3G, 4G, 5G, LTE, and GSM;

connecting an audio input/output device having a cable connection of the wireless telephone base station via a cable to a home telephone in order for a user to place and receive telephone calls;

placing and receiving, with a transceiver of the wireless telephone base station, telephone calls over a wireless network with the home telephone;

receiving, with the transceiver of the wireless telephone base station, Wireless Emergency Alerts that are transmitted via cell broadcast from the wireless network;

translating the Wireless Emergency Alerts into output text;

displaying on a display of the wireless telephone base station the output text of the Wireless Emergency Alerts received via cell broadcast from the wireless network; and playing, with a speaker of the wireless telephone base station, an audio announcement of the Wireless Emergency Alerts, wherein the wireless telephone base station further comprises the speaker operating in conjunction with the audio input/output device, the speaker providing an audio output associated with the emergency alerts that comprises verbalizing and/or reading aloud the emergency alerts;

wherein a processor is further configured to translate the emergency alerts into audible messages and the processor is configured to facilitate the verbalizing and/or the reading aloud the emergency alerts by the speaker of the audio input/output device;

wherein the cable connection comprises a telephone jack arranged on the wireless telephone base station;

wherein the home telephone does not have an ability to receive emergency alerts; and wherein the wireless telephone base station is configured to receive the emergency alerts and display the emergency alerts on the display of the wireless telephone base station.

14. The method of claim 13,
wherein the display is further configured to display a plurality of icons,
wherein the plurality of icons comprise at least one of the following: a clear alert icon that clears an alert from the display, a save alert icon that saves an alert within a memory, and a delete alert icon that leads an alert from a memory,
wherein the Wireless Emergency Alerts comprise Wireless Emergency Alerts generated via cell broadcast from the wireless network.

15. The method of claim 13, wherein:
the playing comprises translating the wireless emergency alerts into audible messages and reading aloud a content of the wireless emergency alert displayed on the wireless telephone base station;
the display is further configured to display an amount of wireless service available; and
the home telephone comprises a standard house phone.

16. The method of claim 13, further comprising:
displaying, with a light generated by the wireless telephone base station in response to receiving the Wireless Emergency Alerts that are received via cell broadcast from the wireless network, that the wireless telephone base station has received the wireless emergency alerts and a type of the received Wireless Emergency Alerts,
wherein the home telephone comprises a wired home phone.

17. The method of claim 13, further comprising:
receiving with a microphone vocal commands from a user; and
implementing with a processor voice recognition software to generate audio input commands,
the audio input commands received by the microphone and recognized by the processor allowing a user to at least one of the following:
clear the Wireless Emergency Alerts received from the wireless network via cell broadcast from the display,
save the Wireless Emergency Alerts received from the wireless network via cell broadcast from the display, and
delete the Wireless Emergency Alerts received from the wireless network via cell broadcast from the display,
wherein the wireless telephone base station is further configured to provide access to voicemail for the home telephone;
wherein the wireless emergency alerts are wireless emergency alerts provided to a limited geographic area; and
wherein the Wireless Emergency Alerts comprise Wireless Emergency Alerts transmitted via cell broadcast from the wireless network.

18. The method of claim 13, further comprising indicating with the wireless telephone base station that the wireless emergency alerts are provided by one of a plurality of alerting authorities,
wherein the Wireless Emergency Alerts comprise Wireless Emergency Alerts transmitted via cell broadcast from the wireless network; and
wherein the wireless telephone base station is further configured to generate audio signals for a telephone call for the home telephone.

19. The method of claim 18, further comprising:
indicating information with the wireless telephone base station regarding which one of the plurality of alerting authorities has provided the wireless emergency alerts and communicating a content of the wireless emergency alerts,
wherein the wireless telephone base station is further configured to generate audio signals for a telephone call for the home telephone, and
wherein the home telephone comprises a wired home phone.

* * * * *